(12) United States Patent
Chai

(10) Patent No.: US 7,956,129 B2
(45) Date of Patent: Jun. 7, 2011

(54) POLYMER BLENDS

(75) Inventor: Choon Kooi Chai, Cabries (FR)

(73) Assignee: Ineos Europe Limited, Hampshire (GB)

( * ) Notice: Subject to any disclaimer, the term of this patent is extended or adjusted under 35 U.S.C. 154(b) by 559 days.

(21) Appl. No.: 10/567,927

(22) PCT Filed: Aug. 12, 2004

(86) PCT No.: PCT/GB2004/003483

§ 371 (c)(1),
(2), (4) Date: Feb. 10, 2006

(87) PCT Pub. No.: WO2005/019333

PCT Pub. Date: Mar. 3, 2005

(65) Prior Publication Data

US 2007/0083009 A1    Apr. 12, 2007

(30) Foreign Application Priority Data

Aug. 19, 2003  (GB) .................................. 0319467.7

(51) Int. Cl.
*C08K 5/00*  (2006.01)
*C08L 23/00* (2006.01)
*C08L 23/04* (2006.01)

(52) U.S. Cl. .......................... 525/191; 525/240; 524/515

(58) Field of Classification Search .................. 525/191, 525/240; 524/515
See application file for complete search history.

(56) References Cited

U.S. PATENT DOCUMENTS

| 4,587,303 | A | | 5/1986 | Turtle | |
|---|---|---|---|---|---|
| 5,506,056 | A | * | 4/1996 | Yoshihara | 428/409 |
| 6,110,599 | A | | 8/2000 | Edwards et al. | |
| 6,417,271 | B1 | * | 7/2002 | Nishihara et al. | 525/105 |
| 6,451,897 | B1 | * | 9/2002 | Niyogi | 524/445 |
| 6,497,965 | B1 | * | 12/2002 | Longmoore et al. | 428/515 |
| 6,723,398 | B1 | * | 4/2004 | Chum et al. | 428/35.2 |
| 6,864,332 | B2 | * | 3/2005 | Braganca et al. | 526/68 |
| 2001/0016627 | A1 | * | 8/2001 | Koshirai et al. | 525/192 |
| 2003/0215659 | A1 | * | 11/2003 | Farley et al. | 428/500 |
| 2004/0053022 | A1 | * | 3/2004 | Ohlsson | 428/213 |
| 2004/0074571 | A1 | * | 4/2004 | Adkins et al. | 148/549 |

FOREIGN PATENT DOCUMENTS

| WO | WO 00/68285 | | 11/2000 |
|---|---|---|---|
| WO | WO 02/48258 | A2 | 6/2002 |

* cited by examiner

*Primary Examiner* — Nathan M Nutter
(74) *Attorney, Agent, or Firm* — Nixon & Vanderhye

(57) ABSTRACT

Novel polymer blends comprise (a) 1-99% by weight of a copolymer of ethylene and an alpha olefin having from 3 to 10 carbon atoms, said copolymer having (iv) a density in the range 0.905 to 0.940 g cm$^{-3}$, (v) a melt elastic modulus G' (G"=500 Pa) in the range 10 to 150 Pa, and (vi) a melt index in the range 5 to 50, and (b) from 1-99% by weight of a low density polyethylene (LDPE) polymer having a density from 0.914 to 0.928 g cm$^{-3}$ wherein the sum of (a) and (b) is 100%. The copolymers of component (a) are typically prepared by use of metallocene catalysts. The blends exhibit advantageous melt elastic modulus in the range 30 to 200 Pa. The blends are particularly suitable for extrusion coating applications.

22 Claims, No Drawings

POLYMER BLENDS

This application is the U.S. National Phase of International Application PCT/GB2004/003483, filed 12 Aug. 2004, which designated the U.S. PCT/GB2004/003483 claims priority to British Application No. 0319467.7 filed 19 Aug. 2003. The entire content of these applications are incorporated herein by reference.

The present invention relates to polymer blends and in particular to polymer blends comprising ethylene-alpha-olefin copolymers and low density polyethylenes. The copolymers may typically be produced using metallocene catalysts and the polymer blends are particularly suitable for extrusion coating applications.

There are a number of different types of known polymers which may suitable be divided by means of their density. For example traditional Ziegler-Nattta catalysts have been used to prepare low density polyethylenes (LDPE's) having densities in a typical range of 0.915 to 0.928. Medium density polyethylenes with typical densities in the range 0.929 to 0.940 and high density polyethylenes with densities greater than 0.940 are also well known. More recently linear low density polyethylenes (LLDPE's) have been produced with densities below 0.915.

Extrusion coated materials are typically dominated by LDPE materials produced in high pressure polymerisation processes. These materials have high melt strengths and are easy to extrude. LLDPE's on the other hand have relatively narrow molecular weight distributions making them more difficult to extrude.

Both types of polymer however have disadvantages in extrusion coating applications for example poor adhesion properties when combined with certain substrates.

WO 02/48258 describes 3—component blends containing LLDPE, HDPE and LDPE also with improved mechanical properties suitable for extrusion coating applications WO 02/00436 describes polymer blends useful for extrusion coating comprising blends of low density polyethylenes with density of less than 0.916 with low density polyethylenes having densities in the range 0.916 to 0.940. Preferably both types of polymer are produced using metallocene catalysts and the blends show improved mechanical properties.

WO 00/68285 describes LLDPE copolymers having a unique combination of properties in particular a narrow molecular weight distribution in the range 2 to 3.4 and an activation energy in the range 28 to 45 kJ/mol. These copolymers may be produced in the gas phase using metallocene catalysts and the reference discloses generally that the copolymers may be blended with other polymer components such as low density polyethylenes (LDPE).

We have now found that polymer blends may be prepared based on LLDPE's and LDPE's wherein the LLDPE's have a narrow molecular weight distribution but which have unique melt index and melt rheological properties leading to improved blends in particular for extrusion coating applications.

Thus according to a first aspect of the present invention there is provided a polymer blend comprising
(a) 1-99% by weight of a copolymer of ethylene and an alpha olefin having from 3 to 10 carbon atoms, said copolymer having
  (i) a density in the range 0.905 to 0.940 g cm$^{-3}$,
  (ii) a melt elastic modulus G'(G"=500 Pa) in the range 10 to 150 Pa, and
  (iii) a melt index in the range 5 to 50, and
(b) from 1-99% by weight of a low density polyethylene polymer having a density from 0.914 to 0.928 g cm$^{-3}$
wherein the sum of (a) and (b) is 100%

The copolymers of component (a) of the polymer blends of the present invention preferably have density in the range 0.907 to 0.930 g cm$^{-3}$ and most preferably in the range 0.907 to 0.915 g cm$^{-3}$.

The copolymers preferably have a melt elastic modulus G'(G"=500 Pa) in the range 10 to 100 Pa and most preferably in the range 12 to 90 Pa.

The copolymers preferably have a melt index in the range 10 to 50 and most preferably in the range 12 to 30.

The copolymers typically exhibit a molecular weight distribution (Mw/Mn) in the range 2 to 3.5.

The copolymers typically have a flow activation energy (Ea) in the range 28-50 and most preferably in the range 30-45.

The copolymers typically exhibit more than one differential scanning calorimetry (DSC) melting peaks between 30° C. and 150° C.

The novel blends of the present invention may additionally comprise other polymer components.

Thus according to a second aspect of the present invention there is provided a polymer blend comprising:
(a) 1-99% by weight of a copolymer of ethylene and an alpha-olefin having 3 to 10 carbon atoms, said copolymer having
  (i) a density in the range 0.905 to 0.940 g cm$^{-3}$,
  (ii) a melt elastic modulus G'(G"=500 Pa) in the range 10 to 150 Pa, and
  (iii) a melt index in the range 5 to 50,
(b) from 1-99% by weight of a low density polyethylene polymer having a density from 0.914 to 0.928 g cm$^{-3}$, and
(c) from 0-98% by weight of a copolymer of ethylene and an alpha-olefin having 3 to 10 carbon atoms or a low density polyethylene.
wherein the sum of (a), (b) and (c) is 100%.

In this aspect of the present invention component (c) may comprise another copolymer having those properties defined in component (a) or may comprise another LDPE polymer as defined in component (b).

Thus the polymer blends according to this aspect of the present invention may comprise for example two different polymers having the properties of component (a) and a polymer of component (b). Alternatively the blend may comprise two different polymers having the properties of component (b) together with a copolymer as defined in component (a).

The copolymers of component (a) of the present invention may typically be prepared by use of catalyst systems comprising transition metal compounds. The transition metal compounds may be used in the presence of a suitable cocatalyst and may be supported.

Examples of suitable transition metal compounds are for example derivatives of Group IIIA, IVA or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group IVB of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-20, 480 (1995).

Preferred transition metal compounds for use in the preparation of the copolymers of component (a) of the present invention is a bulky ligand compound also referred to as a metallocene complex containing at least one of the aforementioned delocalized π-bonded group, in particular cyclopentadienyl ligands. Such metallocene complexes are those based on Group IVA metals for example titanium, zirconium and hafnium.

Metallocene complexes may be represented by the general formula:

LxMQn where L is a cyclopentadienyl ligand, M is a Group IVA metal, Q is a leaving group and x and n are dependent upon the oxidation state of the metal.

Typically the Group IVA metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl)zirconium dichloride, bis(pentamethyl)cyclopentadienyl dichloride, or may be bridged eg. ethylene bis(indenyl)zirconium dichloride or dimethylsilyl(indenyl)zirconium dichloride.

Other suitable bis(cyclopentadienyl)metallocene complexes are those bis(cyclopentadienyl)diene complexes described in WO 96/04290. Examples of such complexes are bis(cyclopentadienyl)zirconium (2.3-dimethyl-1,3-butadiene) and ethylene bis(indenyl)zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

CpMX$_n$ wherein Cp is a single cyclopentadienyl or substituted cyclopentadienyl group optionally covalently bonded to M through a substituent, M is a Group VIA metal bound in a η$^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

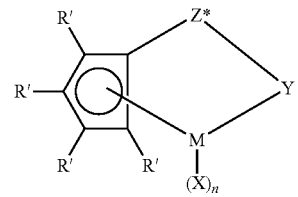

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido)dimethyl(tetramethyl-η$^5$-cyclopentadienyl)silanetitanium dichloride and (2-methoxyphenylamido) dimethyl(tetramethyl-η$^5$-cyclopentadienyl)silanetitanium dichloride.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium[tri(tertiary butyl)phosphinimine]dichloride.

Another suitable type of transition metal compound are monocyclopentadienyl complexes comprising heteroallyl moieties such as zirconium(cyclopentadienyl)tris(diethylcarbamates) as described in U.S. Pat. No. 5,527,752 and WO 99/61486.

Particularly preferred metallocene complexes for use in the preparation of the copolymers of component (a) of the present invention may be represented by the general formula:

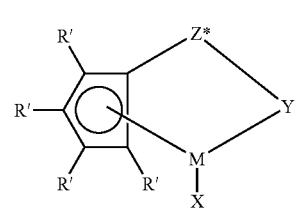

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring-structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or

GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane—or amidoalkanediyl complexes.

Most preferred complexes are those wherein M is titanium.

Specific complexes are those disclosed in WO 95/00526 and are incorporated herein by reference.

A particularly preferred complex is (t-butylamido) (tetramethyl-$\eta^5$-cyclopentadienyl) dimethyl silanetitanium-$\eta^4$-1.3-pentadiene.

Suitable cocatalysts for use in the preparation of copolymers of component (a) of the present invention are those typically used with the aforementioned transition metal compounds.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl)borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

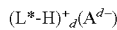

wherein

L* is a neutral Lewis base $(L^*-H)^+_d$ is a Bronsted acid $A^{d-}$ is a non-coordinating compatible anion having a charge of $d^-$, and d is an integer from 1 to 3.

The cation of the ionic compound may be selected from the group consisting of acidic cations, carbonium cations, sylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N.N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl)borate
tri(p-tolyl)(hydroxyphenyl)borate
tris(pentafluorophenyl)(hydroxyphenyl)borate
tris(pentafluorophenyl)(4-hydroxyphenyl)borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogenated tallow alkyl)methylammonium and similar.

Particular preferred cocatalysts of this type are alkylammonium tris(pentafluorophenyl) 4-(hydroxyphenyl)borates. A particularly preferred cocatalyst is bis(hydrogenated tallow alkyl)methyl ammonium tris(pentafluorophenyl) (4-hydroxyphenyl)borate.

With respect to this type of cocatalyst, a preferred compound is the reaction product of an alkylammonium tris(pentaflurophenyl)-4-(hydroxyphenyl)borate and an organometallic compound, for example triethylaluminium or an aluminoxane such as tetraisobutylaluminoxane.

The catalysts used to prepare the copolymers of component (a) of the present invention may suitably be supported.

Suitable support materials include inorganic metal oxides or alternatively polymeric supports may be used for example polyethylene, polypropylene, clays, zeolites, etc.

The most preferred support material for use with the supported catalysts according to the method of the present invention is silica. Suitable silicas include Ineos ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

Most preferred supports are materials that have been pretreated with at least two different organoaluminum compounds Preferred organoaluminium compounds are trialkyl aluminium compounds containing from 1 to 20 carbons atoms in each alkyl group. Preferred trialkylaluminium compounds are trimethylaluminium, triethylaluminium, triisopropylaluminium and triisobutylaluminium.

Preferably the ratio of aluminium to silica in the pretreated supports of the present invention is such that all the available hydroxyl groups are passivated by the pretreatment with the aluminium compounds.

In the preferred embodiment the support material is pretreated sequentially with the organoaluminium compounds.

Suitable catalyst systems for the preparation of copolymers of component (a) of the present invention are those described in WO 04/018530, WO 04/018531, WO 04/020487 or WO 04/055062.

The copolymers of component (a) of the present invention may be prepared in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 2 are prepared 00° C. but preferably from about 60° C. to 100° C. Loop reactors are widely used in slurry polymerisation processes.

Gas phase processes for the polymerisation of olefins, especially for the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

The preferred alpha-olefins are 1-butene, 1-hexene, 4-methyl-1-pentene and 1-octene.

The low density polyethylene polymers (LDPE) of component (b) of the polymer blends of the present invention may be prepared by methods well known in the art and may be prepared using transition metal catalysts for example metallocenes as described above.

The LDPE may for example be prepared by use of conventional autoclave high pressure technology or by tubular reactor technology.

The LDPE may be a homopolymer of ethylene or a copolymer of ethylene and an alpha-olefin with 3 to 10 carbon atoms for example 1-butene, 1-hexene, 4-methyl-pentene and 1-octene.

Other suitable comonomers include-polar vinyl, conjugated and non-conjugated dienes and the like. For example ethylene-vinyl acetate (EVA) copolymers may be suitable as the LDPE component.

The LDPE may also comprise terpolymers.

The LDPE has a density in the range 0.914 to 0.928.

The LDPE may typically have a melt index in the range 0.1 to 25, preferably in the range 0.1 to 10 and most preferably in the range 2 to 8.

The LDPE may typically have a melt elastic modulus, $G'(G''=500\ Pa)$ in the range 30 to 300 Pa, preferably in the range 40 to 250 Pa and most preferably in the range 80 to 200 Pa.

Suitable LDPE's are described in our earlier application WO 99/35174 and may exhibit an increased degree of long chain branching.

The polymer blends of the present invention preferably comprise from 60 to 75% by weight of the copolymer component (a) and from 25 to 40% by weight of the low density polyethylene polymer component (b).

The polymer blends of the present invention may typically have a melt elastic modulus, $G'(G''=500\ Pa)$ in the range 30 to 200 Pa, preferably in the range 45 to 150 Pa and most preferably in the range 60 to 120 Pa.

The most preferred melt elastic modulus is in the range 75-100 Pa.

The polymer blends of the present invention typically exhibit more than one differential scanning calorimetry (DSC) melting peak between 30° C. and 150° C.

The polymer blends of the present invention may be produced by compounding or by dry blending.

The polymer blends of the present invention may be used for applications well known in the art for example films, coatings and articles.

Films may be formed by conventional processes for example casting. The polymer blends may be used as components of monolayer or multilayer films.

Extrusion coatings are typically processed at higher temperatures than films to allow the adhesion of the coating to the substrate.

The films or coatings may typically be used on substrates such as paper, foil, or polymeric materials and may preferably be used for liquid packaging structures.

The polymer blends of the present invention are preferably used for extrusion coating applications.

Thus according to another aspect of the present invention there is provided an extrusion coating comprising a polymer blend comprising (a) 1-99% by weight of a copolymer of ethylene and an alpha-olefin having 3 to 10 carbon atoms, said copolymer having (i) a density in the range 0.905 to 0.940 g cm$^{-3}$, (ii) a melt elastic modulus $G'(G''=500\ Pa)$ in the range 10 to 150 Pa, and (iii) a melt index in the range 5 to 50, and (b) from 1-99% by weight of a low density polyethylene polymer having a density from 0.914 to 0.928 g cm$^{-3}$.
wherein the sum of (a) and (b) is 100%.

Multicomponent blends as described above may also be suitable for use in film and extrusion coating applications.

The present invention will now be illustrated with reference to the following examples.

EXAMPLES

Abbreviations

TEA triethylaluminium
TiBA triisobutylaluminium
TiBAO tetraisobutylaluminoxane
Ionic Compound A [N(H)Me(C$_{18-22}$H$_{37-45}$)$_2$][B(C$_6$F$_5$)$_3$(p-OHC$_6$H$_4$)]
Complex A (C$_5$Me$_4$SiMe$_2$N$^t$Bu)Ti($\eta^4$-1,3-pentadiene)

The following procedures describe the preparation of ethylene copolymers suitable for use as component (a) of the blends of the present invention.

Procedure A
Catalyst Preparation

To 10 g of Grace 948 silica (previously calcined at 250° C. for 5 hours under nitrogen) was added 8.4 ml of an hexane solution of TiBA, 0.952 mol/l (0.8 mmol Al/g silica) followed by the addition of 7.8 ml of an hexane solution of TEA, 1.027 mol/l, (0.8 mmol Al/g silica) The mixture was allowed to react for 2 hours then the silica was decanted, washed three times and dried under vacuum.

[Al]=1.35 mmol/g (ICP measurement).

0.927 ml of a solution of Ionic Compound A (11.1 wt % in toluene) was reacted with with 0.148 ml TiBA in toluene (0.265 mol/l) (molar ratio Al/B=0.5). 2.5 g of the above passivated silica was slowly impregnated (15 min) with this solution and manually agitated until no lumps were visible followed by 30 min holding.

0.440 of a solution of Complex A in heptane (9.17% wt) was then slowly added (15 min) and manually agitated until no lumps were visible followed by 30 min holding.

The catalyst was then washed 3 times with 13 ml of essence and then dried under vacuum.

[Ti]=31 μmol/g; [Al]=1.23 mmol/g
Polymerisation Data

A 2.5 l double jacketed thermostatic stainless steel autoclave was purged with nitrogen at 70° C. for at least one hour. 150 g of PE pellets previously dried under vacuum at 80° C. for 12 hours were introduced and the reactor was then purged three times with nitrogen (7 bar to atmospheric pressure). ~0.13 g of TEA treated silica (1.5 mmol TEA/g) was added under pressure and allowed to scavenge impurities for at least 15 minutes under agitation. The gas phase was then composed (addition of ethylene, 1-hexene and hydrogen) and a mixture of supported catalyst (~0.1 g) and silica/TEA (~0.1 g) was injected. A constant pressure of ethylene and a constant pressure ratio of ethylene/co-monomer were maintained during the run. The run was terminated by venting the reactor and then purging the reactor 3 times with nitrogen. The PE powder produced during the run was then separated from the PE seed bed by simple sieving.

Run Conditions
228 g of PE pellets as bed
T=70° C.
PC2=6.5 Bar.
PC6/C2=0.586 (% vol)
PH2/PC2=1.12 (% vol)
SiO2/TEA impregnated used as scavenger.
catalyst quantity: 90 mg
polymerisation time=90 min At the end of the polymerisation reaction, the polymer produced (33 g, activity 45 g/ghb) had the following properties:

Procedure B

To 10 g of Grace 948 silica (previously calcined at 250° C. for 5 hours under nitrogen) was added 8.4 ml of an hexane solution of TiBA, 0.952 mol/l (0.8 mmol Al/g silica) followed by the addition of 7.8 ml of an hexane solution of triethylaluminium (TEA), 1.027 mol/l, (0.8 mmol Al/g silica) The mixture was allowed to react for 2 hours then the silica was decanted, washed three times and dried under vacuum.

[Al]=1.35 mmol/g (ICP measurement)

1.11 ml of a solution of Ionic Compound A (11.1 wt % in toluene) was reacted with with 0.233 ml TiBAO in cyclohexane (0.081 mol/l) (molar ratio TiBAO/B=2) 3 g of the above passivated silica was slowly impregnated (15 min) with this solution and manually agitated until no lumps were visible followed by 30 min holding. 0.528 of CGC-7 solution in heptane (9.17% wt) was then slowly added (15 min) and manually agitated until no lumps were visible followed by 30 min holding. The catalyst was then washed 3 times with 15 ml of essence and then dried under vacuum.

Polymerisation Data

The general procured of Example 1 was repeated under the following conditions;
221 g of PE pellets as bed
T=70° C.
PC2=6.5 Bar.
PC6/C2=0.595 (% vol)
PH2/PC2=1.23
SiO2/TEA impregnated used as scavenger.
catalyst quantity: 91 mg
polymerisation time=75 min At the end of the polymerisation reaction, the polymer produced (24 g, activity 35 g/ghb) had the following properties:

Procedure C

To 30 g of Ineos ES70 silica (previously calcined at 500° C. for 5 hours under nitrogen, pore volume 1.55 ml/g) was added a solution made with 28.1 ml of a hexane solution of triisobutylaluminium (TiBA), 0.96 mol/l, and 18.4 ml of hexane. The mixture was allowed to react for 2 hours minutes under agitation then dried under vacuum.

The activator solution was prepared by reacting 15.1 ml of a solution of Ionic Compound A (11.1 wt % in toluene) with 2.4 ml TiBA solution in toluene (0.265 mol/l) (molar ratio Al/B=0.5). This solution was then slowly impregnated (15 min) to the above TiBA treated silica and manually agitated until no lumps were visible.

10 ml of 1-hexene were then added and the mixture was then agitated for 30 minutes. 7.16 ml of a solution of Complex A in heptane (9.17% wt) were slowly added (15 min) and manually agitated until no lumps were visible. The mixture was then allowed to stand for 1 hour.

Catalyst was then dried under vacuum.
Procedure D
Passivation of Silica

To 10 Kg of silica ES70 (previously calcined at 500° C. for 5 hours) was added 10.5 liters of 950 mMAl/liter of TiBA in hexane-followed by the addition of 5 liters of hexane. After 2 hours stirring at 30° C. the silica was dried under vacuum at 60° C.

Catalyst Preparation 5.7 L of the Ionic Activator A in toluene (11.1% wt) was added to 3.4 L of hexane, then 1.2 L of TIBAO in cyclohexane (0.812 mol/l) was added and the mixture was allowed to react for 1 hour. The passivated silica was slowly impregnated (1 h) with this solution under agitation followed by 2 h holding. 2.2 l of a solution of the Complex A in heptane (11.64% wt) was then slowly added (1 h) under agitation followed by 1 h holding. The mixture was dried under vacuum and then 28.5 L of hexane was slowly added (30 minutes) under agitation followed by 1.5 h holding. The resultant catalyst was finally dried under vacuum Procedure E
Passivation of Silica To 10 Kg of silica ES70 (previously calcined at 500° C. for 5 hours) was added 10.5 liters of 950 mMAl/liter of TiBA in hexane followed by the addition of 5 liters of hexane. After 2 hours stirring at 30° C. the silica was dried under vacuum at 60° C.

Catalyst Preparation 4.2 L of the Ionic Activator A in toluene (11.1% wt) was added to 1.5 L of hexane, then 0.19 L of TIBA in hexane (0.950 mol/l) was added and the mixture was allowed to react for 1 hour. The passivated silica was slowly impregnated (1 h) with this solution under agitation followed by 1 h holding. 3.8 of 1-hexene was subsequently added over a period of 30 minutes followed by 30 minutes holding. 1.6 l of a solution of the Complex A in heptane (11.64% wt) was then slowly added under agitation followed by 1 h holding. The resultant catalyst was finally dried under vacuum.

Procedure F
Passivation of Silica

To 10 Kg of silica Grace-Davison 948 (previously calcined at 250° C. for 5 hours) in 110 liters of hexane was added 12.9 liters of 0.7 MAl/liter of TIBA in hexane followed by the addition of 18 liters of 0.5 MAl/liter of TEA pentane. After 2 hours stirring at 30° C. the silica was washed 5 times with 130 liters hexane and dried under vacuum.

Catalyst Preparation 7.3 L of the solution of the Ionic Activator A in toluene (9.7% wt) was added to 1.5 L of hexane, then 1.3 L of TIBAO in cyclohexane (0.816 mol/l) (molar ratio TiBAO/Ionic activator A=2) were added and the mixture was allowed to react for 1 hour. The passivated silica was slowly impregnated (1 h) with this solution under agitation followed by 1 h holding. 3.1 l of a solution of the Complex A in heptane (8.58% wt) was then slowly added under agitation followed by 1 h holding. 60 L of hexane were then added and the suspension was stirred for 1 h. The resultant catalyst was washed 3 times with 150 L of hexane and then dried under vacuum.

Procedure G
Passivation of Silica

To 10 Kg of silica Grace-Davison 948 (previously calcined at 250° C. for 5 hours) in 110 liters of hexane was added 36 liters of 0.5 MAl/liter of TEA in pentane. After 1 hour stirring at 30° C. the silica was washed 5 times with 130 liters hexane and dried under vacuum.

Catalyst Preparation 1.43 L of TEA in pentane (0.5 mol/l) was added to 9.7 L of the Ionic Activator A in toluene (9.6% wt) and the mixture was allowed to react for 15 minutes. The passivated silica was slowly impregnated (45 minutes) with this solution under agitation followed by 30 minutes holding.

2.8 of 1-hexene were added to 4 l of a solution of the Complex A in heptane (8.63% wt) under agitation. The resultant mixture was added over 30 minutes to the above treated support followed by 1 hour holding. The resultant catalyst was finally dried under vacuum.

The catalysts prepared in procedures C-G were used to copolymerise ethylene and 1-hexene by use of a process similar to those described in procedures A and B.

Physical Properties

Molecular Weight Distribution ($M_w/M_n$) Measurements by GPC/on-Line Viscometry.

Apparent molecular weight distribution and associated averages, uncorrected for long chain branching, were determined by Gel Permeation Chromatography using a GPCV 2000 from Waters. Acquisition is done using Alliance software from the same supplier.

The apparatus settings were the following:
Column temperature: 150° C.
Injector temperature: 150° C.
Pump temperature: 50° C.
Injection volume; 217.5 µl
Elution time: 60 min
Eluant: 1,2,4 Trichlorobenzene stabilised with 0.05% BHT
Flow rate: 1 ml/min
Columns set: 2 Shodex AT806MS+1 Waters HT2 with a plate count (at half height) of typically 26,000.
Detector: differential refractometer.

Prior to the elution, the polyethylene samples were dissolved at 150° C. for 2 hours with stirring in 1,2,4 Trichlorobenzene stabilised with 0.05% BHT. The polyethylene concentration is 0.1% w/w.

A relative calibration was constructed using narrow polystyrene standards. The molecular weight and the solution concentrations are listed in the below table.

| # Vial | M (PS) | PD | Mass (mg) for 30 ml of solvent |
|---|---|---|---|
| 1 | 76600 | 1.03 | 34.125 |
| 2 | 3900000 | 1.05 | 6.75 |
|   | 50400 | 1.03 | 42.75 |
| 3 | 1950000 | 1.04 | 8.625 |
|   | 30300 | 1.02 | 42.75 |
| 4 | 995000 | 1.04 | 8.625 |
|   | 21000 | 1.02 | 42.75 |
| 5 | 488400 | 1.05 | 17.25 |
|   | 9860 | 1.02 | 51.375 |
| 6 | 195000 | 1.02 | 25.5 |
|   | 2100 | 1.05 | 68.25 |

The elution volume, V, was recorded each PS standard.

The PS molecular weight was converted in PE equivalent using the following Mark Houwink constants:
$\alpha_{PS}=0.67$ $K_{PS}=0.000175$
$\alpha_{PE}=0.706$ $K_{PE}=0.00051$ The calibration curve $Mw_{PE}=f(V)$ was then fitted with a $3^{rd}$ polynomial equation. All the calculations are done with Millennium 32 software from Waters.

This calibration has been checked against the NIST certified polyethylene BRPE0 the values obtained being 53,000 for Mw and 19,000 for Mn.

Dynamic Rheological Analysis

Rheological measurements are carried out on a dynamic rheometer (e.g., Rheometrics RDS-2, ARES) with 25 mm diameter parallel plates in a dynamic mode. For all experiments, the rheometer has been thermally stable at 190° C. for at least 30 minutes before inserting the appropriately stabilised (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

Measurement of Melt Elastic Modulus G'(G"=500 Pa) at 190° C.

The frequency sweep (FS) experiment is then carried out at 190° C. using the above appropriately selected strain level and the dynamic rheological data thus measured are then analysed using the rheometer software (viz., Rheometrics RHIOS V4.4 or Orchestrator Software) to determine the melt elastic modulus G'(G"=500 Pa) at a constant, reference value (500 Pa) of melt viscous modulus (G").

Flow Activation Energy (Ea) Measurement

The bulk dynamic Theological properties (eg G', G" and η*) of all the polymers were then measured at 170°, 190° and 210° C. At each temperature, scans were performed as a function of angular shear frequency (from 100 to 0.01 rad/s) at a constant shear strain appropriately determined by the above procedure.

The dynamic rheological data was then analysed using the Rheometrics Software. The following conditions were selected for the time-temperature (t-T) superposition and the determination of the flow activation energies ($E_a$) according to an Arrhenius equation, $a_T = \exp(E_a/kT)$, which relates the shift factor ($a_T$) to $E_a$:

| Rheological Parameters: | G'(ω), G"(ω) & η*(ω) |
|---|---|
| Reference Temperature: | 190° C. |
| Shift Mode: | 2D (i.e., horizontal & vertical shifts) |
| Shift Accuracy: | High |
| Interpolation Mode: | Spline |

Melt index (190° C./2.16 kg) was measured according to ISO 1133 method.

Density was measured using a density column according to ISO 1872/1-1986, except that the melt index extrudates were not annealed but were left to cool on a sheet of polymeric material for 30 minutes Melting behaviour was determined by differential scanning calorimetry using a Perkin Elmer DSC-7 instrument, following the methodology outlined in ASTM D3417 except that the first heating was carried out at 20° C./min. The peak melting temperature was taken as the temperature corresponding to the maximum heat flow observed during the second heating of the polymer at 10° C./min The physical properties of the ethylene-1-hexene copolymers of component (a) of the present invention are shown in Table 1.

TABLE 1

| Example | Method of prep. | Density (g/mol) | Melt Index (g/10 ml) | G' (G" = 500 Pa) (Pa) | Ea (kJ/mol) | Mw/Mn | Peak Melting Temperatures (° C.) |
|---|---|---|---|---|---|---|---|
| 1 | A | 0.9080 | 14.9 | 35 | | | |
| 2 | B | 0.9130 | 23.6 | 34 | | | |
| 3 | C | 0.9121 | 20.9 | 13.9 | 37.8 | 2.7 | 99.2/117.2 |
| 4 | C | 0.9121 | 14.8 | 13.8 | 34.7 | 2.7 | 99.5/116.7 |
| 5 | C | 0.9111 | 19.2 | 15.0 | 38.9 | 2.6 | 99.5/116.9 |
| 6 | C | 0.9118 | 16.6 | 13.6 | 36.5 | 2.8 | 99.6/117.0 |
| 7 | C | 0.9137 | 19.4 | 13.2 | 37.0 | 2.7 | 99.6/115.7 |
| 8 | C | 0.9134 | 17.3 | | | 2.5 | 99.1/116.3 |
| 9 | C | 0.9124 | 18.6 | 13.0 | 37.0 | | |
| 10 | D | 0.9120 | 28.7 | 31.8 | | 2.6 | |
| 11 | D | 0.9150 | 10.8 | 41.4 | | 3.2 | |
| 12 | E | 0.9175 | 21.5 | 21.0 | | 2.6 | |
| 13 | E | 0.9090 | 15.0 | 19.1 | | 2.7 | |
| 14 | F | | | 13.9 | | | |
| 15 | G | 0.9115 | 21.0 | 18.0 | | 2.7 | 97.4/114.7/119.4 |
| 16 | G | 0.9105 | 19.7 | 14.0 | | 3.0 | |
| 17 | G | | 19.6 | 12.4 | | 2.5 | 89.2/111.7/117 |
| 18 | G | 0.9113 | 21.3 | 15.9 | 33.37 | 3.4 | 96.0/116.7/121.5 |
| 19 | G | 0.9176* | 11.53 | 21.8 | 33.1 | 3.6 | 97.7/118.5/122.7 |

*Note:
Density measurement according to ASTM D 792.

The following linear low density polyethylenes (LDPE) were used as components (b) of the blends of the present invention:

TABLE 2

| LDPE | Reference | Density (g/mol) | G' (G" = 500 Pa) (Pa) | Melt index (g/10 ml) |
|---|---|---|---|---|
| A | BP 19N430 | 0.920 | 115.2 | 7.5 |
| B | BP 21H460 | 0.922 | 96.3 | 1.5 |
| C | BP 18R430 | 0.918 | 103 | 15 |
| D | BP EXP 2350 | 0.917 | 154.2 | 4 |
| E | Exxon LD250 | 0.916 | 117.2 | 5 |

The LDPE samples A-D were prepared using BP's high pressure polymerisation process and their densities were measured according to ISO 1872/1: Samples A-C are available commercially. Sample E is a commercially available material.

The following 2—component blends were prepared by combination of the above copolymers and low density polyethylenes (LDPE). The blends were prepared by melt blending on an extruder (single screw) of diameter 20 mm, L:D ratio of 24:1, screw speed of 70 rpm and temp profile of 170° C.-190° C.

TABLE 3

| LLDPE (Example) | LDPE | LLDPE/ LDPE | Density (g/mol) | Melt index (g/10 ml) | G' (G" = 500 Pa) (Pa) | Ea (kJ/mol) | Mw/Mn | Peak Melting Temperatures (° C.) |
|---|---|---|---|---|---|---|---|---|
| 9 | C | 60:40 | 0.9130 | 16.8 | 45.9 | 60.4 | | 100.5/116.2/120.2 |
| 9 | C | 75:25 | 0.9132 | 7.1 | 37.4 | 57.8 | | 100/116.9/120.6 |
| 10 | B | 70:30 | | | 78 | | 3.6 | |
| 11 | A | 70:30 | | | 81 | | 4.3 | |
| 12 | B | 70:30 | | | 85.9 | | 3.6 | |
| 13 | A | 70:30 | | | 63 | | 3.9 | |
| 3 | B | 70:30 | | | 74.1 | | 3.9 | |
| 14 | E | 70:30 | | | 68.4 | | | |
| 15 | E | 67:33 | 0.9146 | 10.48 | 88.8 | | | 100.7/112.5 |
| 16 | D | 70:30 | 0.9128 | 12 | 75.4 | | | 102.2/114.9 |
| 17 | E | 70:30 | 0.9081 | | 73.1 | | | 100.2/109.7 |
| 19 | D | 75:25 | 0.9172* | 8.46 | 68 | | | 102/118.5/123.1 |
| 19 | D | 60:40 | 0.9170* | 7.17 | 89.1 | | | 102/117.5/122.2 |
| 19 | A | 60:40 | 0.9178* | 8.38 | 72.9 | | | 103.2/117.7/122.4 |
| 18 | E | 75:25 | 0.9142* | 14.37 | 67.4 | | | 101/114.6 |
| 18 | E | 60:40 | 0.9146 | 10.76 | 96.9 | | | 102/113.1 |
| 18 | A | 60:40 | 0.9155* | 13.35 | 76.1 | | | 103.7/113.4 |

*NB Density measurements according to ASTM D 792

A comparative blend was prepared based on 70% Exact 0210 (ExxonMobil) having a density of 0.902 (ISO 1183), peak melting temperature (DSC) 96.0° C., melt index of 10 (ISO 1133) and G$^1$ of 36.6 Pa and 30% of LDPE E from Table 2 (Exxon LD250). The comparative blend had a density of 0.907.4, melt index of 7.85 and G$^1$ of 72.4 Pa. The comparative blend exhibited a clear single melting peak at 101.4° C. This comparative blend is based on a copolymer having properties different from that of component (a) of the present invention.

An advantage of the novel blends of the present invention is the low melting temperatures of the blends which is important for sealing properties (low minimum fusion temperature) while the structure of the copolymers of component (a) of the blends provides excellent hot tack strength. These advantages are particularly important for use of the blends for extrusion coating application e.g. packaging. The copolymers of component (a) of the blends, in addition to their excellent processability, which approaches that of pure LDPE's, exhibit low neck-in and high down when blended with the LDPE of component (b).

The invention claimed is:

1. A polymer blend comprising:
   (a) 1-99% by weight of a copolymer of ethylene and an alpha olefin having from 3 to 10 carbon atoms, said copolymer having
      (i) a density in the range 0.905 to 0.940 g cm$^{-3}$,
      (ii) a melt elastic modulus G' (G"=500 Pa) in the range 10 to 150 Pa, and
      (iii) a melt index (190° C./2.16 kg) in the range 5 to 50 g/10 ml, and
   (b) from 1-99% by weight of a low density polyethylene (LDPE) comprising a homopolymer of ethylene having a density from 0.914 to 0.928 g cm$^{-3}$,
   wherein the sum of (a) and (b) is 100%.

2. A polymer blend according to claim 1 wherein the copolymer of component (a) has a density in the range 0.907 to 0.915 g cm$^{-3}$.

3. A polymer blend according to claim 1 wherein the copolymer of component (a) has a melt index in the range 12 to 50 g/10 ml.

4. A polymer blend according to claim 1 wherein the copolymer of component (a) has a melt elastic modulus G' in the range 11 to 90 Pa.

5. A polymer blend according to claim 1 wherein the copolymer of component (a) has a flow activation energy (Ea) in the range 28 to 50 kJ/mol.

6. A polymer blend according to claim 1 wherein the copolymer of component (a) has a Mw/Mn in the range 2 to 3.5.

7. A polymer blend according to claim 1 wherein the copolymer of component (a) exhibits more than one differential scanning calorimetry (DSC) melting peaks between 30° and 150° C.

8. A polymer blend according to claim 1 wherein the LDPE of component (b) has a melt index in the range 0.1 to 25 g/10 ml.

9. A polymer blend according to claim 1 wherein the LDPE of component (b) has a melt elastic modulus G' in the range 80 to 200 Pa.

10. A polymer blend according to claim 1 wherein the ratio of component (a) to component (b) is in the range 60:75 to 40:25 by weight.

11. A polymer blend according to claim 1 wherein the blend has a melt elastic modulus G' in the range 30 to 200 Pa.

12. A polymer blend according to claim 11 wherein the blend has a melt elastic modulus G' in the range 30 to 200 Pa.

13. A polymer blend according to claim 12 wherein the blend has a melt elastic modulus G' in the range 60 to 120 Pa.

14. A polymer blend according to claim 13 wherein the melt elastic modulus G' is in the range 75-100 Pa.

15. A polymer blend comprising:
   (a) 1-99% by weight of a copolymer of ethylene and an alpha olefin having from 3 to 10 carbon atoms, said copolymer having
      (iv) a density in the range 0.905 to 0.940 g cm$^{-3}$,
      (v) a melt elastic modulus G' (G"=500 Pa) in the range 10 to 150 Pa, and
      (vi) a melt index (190° C./2.16 kg) in the range 5 to 50 g/10 ml, and (b) from 1-99% by weight of a low density polyethylene (LDPE) comprising a homopolymer of ethylene having a density from 0.914 to 0.928 g cm$^{-3}$, and (c) from 0-98% by weight of a copolymer of ethylene and an alpha-olefin having 3 to 10 carbon atoms or a low density polyethylene (LDPE), wherein the sum of (a), (b) and (c) is 100%.

16. A polymer blend according to claim 1 wherein the copolymer of component (a) is prepared by use of a catalyst system comprising a transition metal compound.

17. A polymer blend according to claim 16 wherein the transition metal compound is a metallocene.

18. A polymer blend according to claim 17 wherein the metallocene has the general formula:

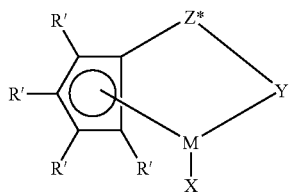

wherein:—

R' each occurrence is independently selected from hydrogen, hydrocarbyl, silyl, germyl, halo, cyano, and combinations thereof, said R' having up to 20 non-hydrogen atoms, and optionally, two R' groups, where R' is not hydrogen, halo or cyano, together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$-complex with M;

Y is —O—, —S—, —NR*—, —PR*—;

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or

GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z*, when R* is not hydrogen, or an R* group from Z* and an R* group from Y form a ring system.

19. A polymer blend according to claim 16 wherein the copolymer is prepared in the gas phase.

20. A polymer blend according to claim 1 wherein the low density polyethylene (LDPE) of component (b) is prepared by a high pressure process.

21. An extrusion coating comprising a polymer blend comprising:

(a) 1-99% by weight of a copolymer of ethylene and an alpha olefin having from 3 to 10 carbon atoms, said copolymer having
 (i) a density in the range 0.905 to 0.940 g cm$^{-3}$,
 (ii) a melt elastic modulus G' (G"=500 Pa) in the range 10 to 150 Pa, and
 (iii) a melt index (190° C./2.16 kg) in the range 5 to 50 g/10 ml, and (b) from 1-99% by weight of a low density polyethylene (LDPE) comprising a homopolymer of ethylene having a density from 0.914 to 0.928 g cm$^{-3}$, wherein the sum of (a) and (b) is 100%.

22. An extrusion coating comprising a polymer blend comprising:

(a) 1-99% by weight of a copolymer of ethylene and an alpha olefin having from 3 to 10 carbon atoms, said copolymer having
 (i) a density in the range 0.905 to 0.940 g cm$^{-3}$,
 (ii) a melt elastic modulus G' (G"=500 Pa) in the range 10 to 150 Pa, and
 (iii) a melt index (190° C./2.16 kg) in the range 5 to 50 g/10 ml, (b) from 1-99% by weight of a low density polyethylene (LDPE) comprising a homopolymer of ethylene having a density from 0.914 to 0.928 g cm$^{-3}$, and (c) from 0.98% by weight of a copolymer of ethylene and an alpha olefin having 3 to 10 carbon atoms or a low density polyethylene (LDPE) polymer wherein the sum of (a), (b) and (c) is 100%.

* * * * *